| United States Patent [19] | [11] Patent Number: 4,636,238 |
| Sidler | [45] Date of Patent: Jan. 13, 1987 |

[54] CONTROL OF APPARATUS FOR USE IN THE MANUFACTURE OF GLASSWARE ARTICLES

[75] Inventor: Werner Sidler, Esslingen, Switzerland

[73] Assignee: Emhart Industries, Inc., Farmington, Conn.

[21] Appl. No.: 790,583

[22] Filed: Oct. 23, 1985

[30] Foreign Application Priority Data

Oct. 27, 1984 [GB] United Kingdom ................. 8427222

[51] Int. Cl.⁴ .............................................. C03B 9/40
[52] U.S. Cl. ........................................ 65/29; 65/165; 65/DIG. 13
[58] Field of Search ......... 65/163, 225, 304, DIG. 13, 65/29

[56] References Cited

U.S. PATENT DOCUMENTS

| 4,007,028 | 2/1977 | Bublitz et al. ............ 65/DIG. 13 X |
| 4,357,157 | 11/1982 | Cardenas-Franco et al. .... 65/163 X |
| 4,409,013 | 10/1983 | Cardenas et al. ..................... 65/163 |
| 4,457,772 | 7/1984 | Haynes et al. ........... 65/DIG. 13 X |
| 4,529,429 | 7/1985 | Wood ................................. 65/163 X |
| 4,557,746 | 12/1985 | Braithwaite et al. .... 65/DIG. 13 X |

Primary Examiner—Arthur Kellogg
Attorney, Agent, or Firm—Arthur B. Moore

[57] ABSTRACT

The apparatus comprises a furnace, a forehearth channel (10) through which molten glass flows to a feeder (14, 16) which forms gobs (12) of molten glass, a gob distributor (24) which distributes the gobs to the sections (30) of a glassware forming machine of the individual section type (26) and control means (50) operable to determine operating parameters for the apparatus to allow a particular article to be manufactured. The parameters including the number of sections (30) which are to receive gobs and the speed at which those sections are to be operated, the parameters being determined from the available melting capacity of the furnace, the weight of the particular article and the speed at which it can be formed.

8 Claims, 4 Drawing Figures

Fig_1

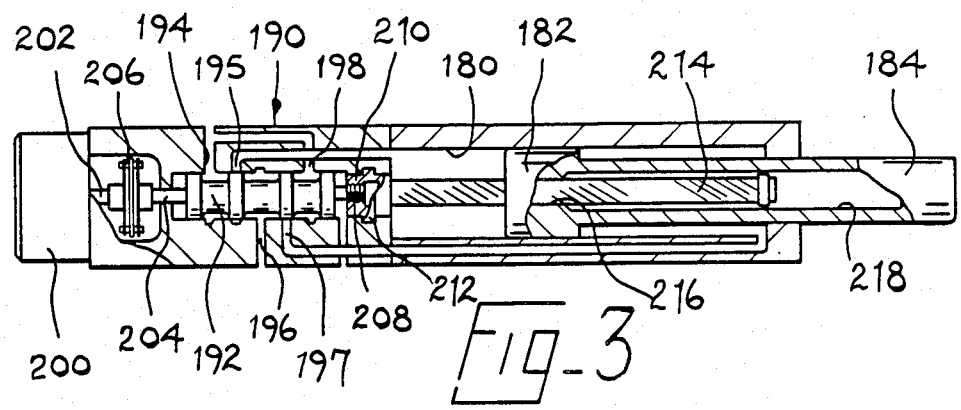

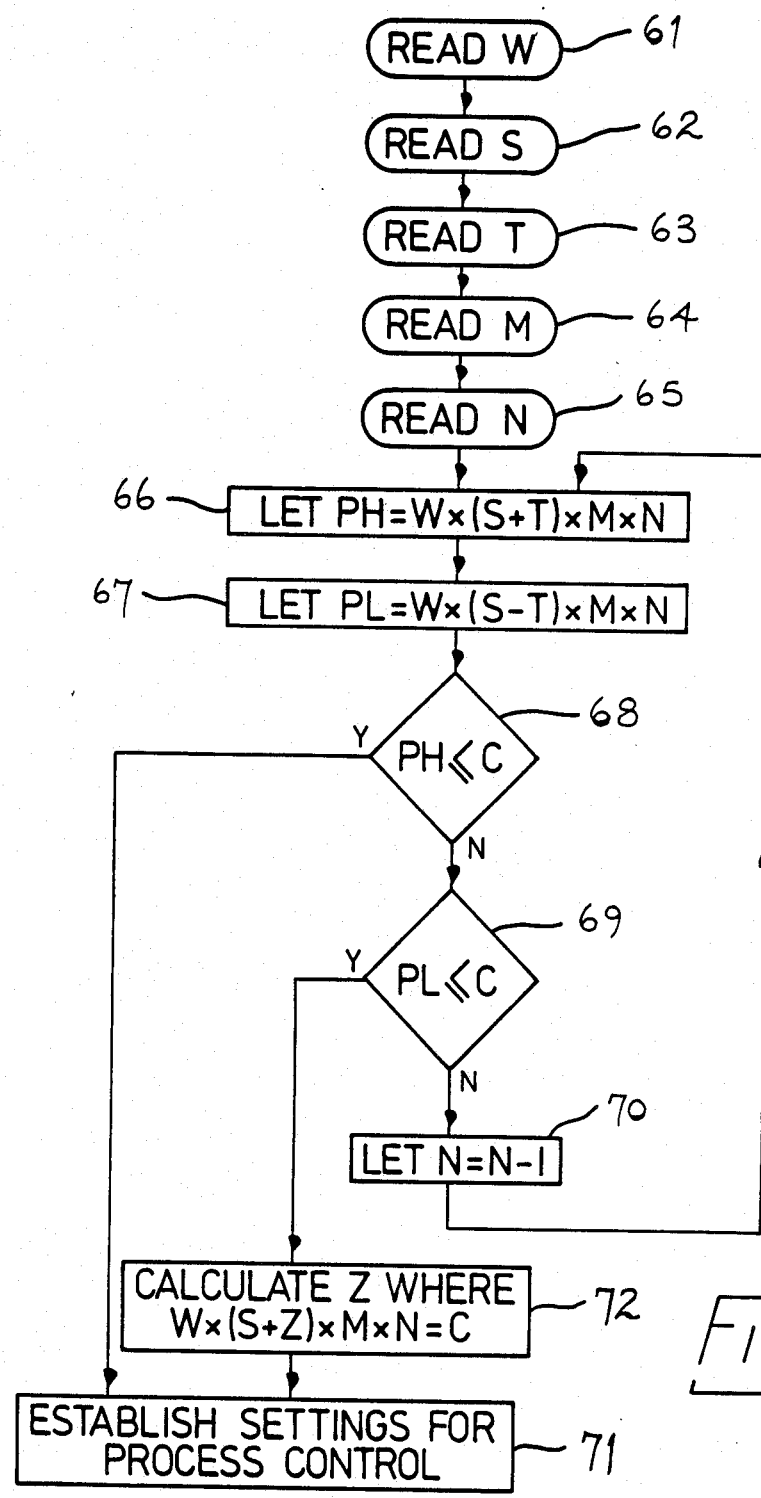
Fig_4

CONTROL OF APPARATUS FOR USE IN THE MANUFACTURE OF GLASSWARE ARTICLES

BACKGROUND OF THE INVENTION

This invention is concerned with apparatus for use in the manufacture of glassware articles and with a method of controlling such apparatus.

A conventional apparatus for use in the manufacture of glassware articles comprises a furnace in which raw materials are melted to form molten glass, a forehearth channel through which molten glass flows out of the furnace, a feeder associated with the forehearth and operable to form molten glass in the forehearth into discrete gobs which fall from the feeder, a gob distributor arranged to distribute gobs falling from the feeder to the sections of a glassware forming machine of the individual section type of the apparatus, a control system for the glassware forming machine operable to control the timing of the operation of components of the sections of the machine in timed relationship to one another so that gobs received are formed into articles of glassware which are deposited on a deadplate of the section, and pusher means associated with each section of the machine operable to push articles from the deadplate of the section onto a conveyor of the apparatus which runs past the deadplates of all the sections. A glassware forming machine of the individual section type comprises a plurality of independent glass manufacturing units, called "sections", each of which operates to manufacture gobs of molten glass into articles of glassware. The sections operate under the control of the control system therefor, which is usually an electronic control system, to form gobs into articles of glassware with the sections operating with phase differences between them related to the intervals at which gobs are produced by the feeder so that, at any given time, each section is at a different stage of its operation from all the others.

In a conventional apparatus as described above, the feeder is operated by an AC electric motor driving a cam, which causes movement of a plunger surrounded by a tube of the feeder which opens and closes at least one orifice in the bottom of the channel to allow glass to flow through the orifice, and a further cam which controls the action of shears which shear the glass flowing through the orifice into gobs. A timing signal for the control of, the remainder of the apparatus is taken from the shaft of the feeder and fed to the electronic control system for the glassware forming machine so that the machine is operated in synchronisation with the action of the feeder. The gob distributor of a conventional machine comprises at least one gob-delivering scoop which is moved to align with gob-delivering guides of the various sections. The gob distributor is driven by an AC electric motor which operates a cam which causes the scoop to be aligned with the sections in a predetermined sequence. The frequency of the electric power supplied to the motor of the gob distributor is related to the frequency of the supply to the motor of the feeder so that the gob distributor operates in synchronisation with the operation of the feeder to distribute the gobs supplied by the feeder to the appropriate sections of the machine. The pusher means associated with the sections of the machine are operated by a common AC motor which drives a shaft on which one cam for each section is mounted to operate the pusher means of that section. The frequency of the power supplied to the motor of the pusher means is related to that supplied to the motors of the feeder and the gob distributor so that the pusher means operates in synchronisation with the feeder and the gob distributor and with the operation of the sections of the machine. The position of the cams on the shaft determines the order of the operation of the pusher means of the sections, the order being in most cases the same as the predetermined order of gob supply by the gob distributor. The conveyor of a conventional machine is also operated by an AC motor so that the speed of the conveyor depends on the frequency of the electric supply to the motor and this frequency is related to that supplied to the feeder, the gob distributor, and the pusher means so that the conveyor runs at an appropriate speed to collect all the articles formed by the machine.

In a conventional apparatus, it is possible to speed up or slow down the operation of the apparatus by altering the frequency of the power supply to the various AC motors. However, the characteristics of a particular article being manufactured determine to what extent the apparatus can be so speeded up or slowed down. In the operation of the glassware forming machine, a certain amount of heat has to be extracted from the glass to enable the article to be successfully formed and sufficient time has to be available for this heat extraction to occur. On the other hand, the glass must not be allowed to cool so much that the glass cannot be formed. The amount of time which is required depends on the characteristics of the glass used in the apparatus, the weight of the article being manufactured, the surface area of the article, and in some cases, on the shape of the article being manufactured. In general, it is only possible to speed up or slow down the apparatus by approximately 2%.

Clearly, an apparatus of the type described cannot be operated so that a greater quantity of glass is used by the machine than can be melted by the furnace. The quantity used by the machine depends on the number of sections the machine has, the number of moulds which are used simultaneously in each section (it being common practice to use two or more moulds in each section so that each section operates on two or more gobs simultaneously), and on the weight of the article being manufactured. The only variable factor among these factors in a conventional apparatus is the speed of the machine which, as aforementioned, can only be adjusted within a narrow range. Thus, with a conventional apparatus it is seldom possible to match the melting capacity of the furnace to the glass usage by the machine. This is an undesirable situation because, as it is necessary to maintain the glass in the furnace at a constant level to ensure constant flow conditions from the furnace into the forehearth, heat losses from the furnace are substantially constant whatever the glass usage and form a considerable expense. Thus, if a furnace is used at substantially below its full melting capacity the heat losses are more significant when considered in terms of the number of saleable articles produced. The desirable situation that the glass usage substantially equals the melting capacity of the furnace is seldom, if ever, achieved with conventional apparatus.

It is an object of the present invention to provide an apparatus of the type described in which the melting capacity of the furnace can be more fully utilised than is generally the case with conventional apparatus.

BRIEF SUMMARY OF THE INVENTION

The invention provides apparatus for use in the manufacture of glassware articles comprising a furnace in which raw materials are melted to form molten glass, a forehearth channel through which molten glass flows out of the furnace, a feeder associated with the forehearth and operable to form molten glass in the forehearth into discrete gobs which fall from the feeder, a gob distributor arranged to distribute gobs falling from the feeder to the sections of a glassware forming machine of the individual section type of the apparatus, the gob distributor being electronically programmable to determine which of the sections of the machine receive gobs and the sequence in which those sections receive gobs, an electronic control system for the glassware forming machine operable to control the timing of the operation of components of those sections which receive gobs in timed relationship to one another so that gobs received by a section are formed into articles of glassware which are deposited on a deadplate of the section, and pusher means associated with each section of the machine operable to push articles from the deadplate of the section onto a conveyor of the apparatus which runs past the deadplates of all the sections, wherein the apparatus also comprises control means operable to determine the operating parameters of the apparatus to allow a particular article to be manufactured, the parameters including the number of sections of a glassware forming machine which are to receive gobs, and the speed at which those sections are to be operated, the parameters being determined from the available melting capacity of the furnace, the weight of the particular article and the speed at which the particular article can be formed.

In an apparatus in accordance with the last preceding paragraph, the glass usage can be "tuned" in two ways by the speed of the machine or by the number of sections employed. This means that instead of only the fine tuning by means of the speed of the machine which is available in the conventional apparatus described above, the apparatus has a "coarse" tuning by means of the number of sections employed and also the same fine tuning ability by means of alteration of the speed of the machine. While conventional apparatuses exist in which the sections of the machine are controlled by an electronic control system so that it is possible to re-program the control system to alter the timing of the operations of the sections, such apparatuses have cam operated gob distributors, feeders and pusher means. Such gob distributors, feeders and pusher means cannot readily be re-programmed so that the glass usage cannot be adjusted by altering the number of sections in operation. It is common practice to operate less than the full number of sections of a machine, where one or more sections are undergoing maintenance or repair, but, in this case, the operation of the feeder and gob distributor remains unchanged but the gobs are intercepted before reaching the inoperative sections and are directed into a cullet chute. The fact that one or more sections are inoperative does not affect the glass usage or "pull on the furnace" and does not provide a method of tuning the pull to the melting capacity of the furnace. However, in an apparatus according to the last preceding paragraph, the gob distributor and the pusher means can be re-programmed to suit the operation of any desired number of sections up to the total available and the speed of the feeder and the conveyor can be adjusted accordingly.

The apparatus, therefore, requires the use of a programmable gob distributor and programmable pusher means. Programmable gob distributors have been suggested to overcome the problems of cam wear in conventional gob distributors and also to avoid the necessity for changing the cam when the predetermined sequence of sections is to be changed. Programmable pusher means have also been suggested to avoid the problems of cam wear and the difficulties of adjusting the large number of cams involved in relation to one another. These proposed gob distributors and pusher means are operated by electrical servo motors which are of conventional construction and are re-programmable by changing the electrical control signals thereto. It is also possible to provide a different power source for driving the gob distributor and/or the pusher means but to provide it with servo control. Thus, it is known to provide re-programmable gob distributors and pusher means but it is, as far as is known to the applicants, not been proposed to combine the re-programmable gob distributor and pusher means in the same machine and to provide a control means which determines the number of sections to be operated.

The parameters determined by the control means may also include the sequence in which the sections are to receive gobs. This is because the sequence may require modification depending on the number of sections, and which sections, are in operation. Furthermore, settings for the cooling system of the sections may also be included among the parameters, e.g. for how long cooling air is to be applied.

The control means may be operable to provide control signals to the gob distributor and the electronic control system to cause them to operate in accordance with the predetermined parameters or may merely indicate the settings for the gob distributor and electronic control system to an operator of the apparatus so that he can make the necessary settings. The control means may also be operable to provide control signals to the feeder, the pushers and the conveyor to cause them to operate in cooperation with the gob distributor and electronic control system. Furthermore, the control means may also be operable to provide control signals to article handling apparatus to which the conveyor delivers the articles. Such handling apparatus may comprise a transfer wheel which transfers the articles from the conveyor to a further conveyor, a further conveyor, and a stacker.

In order to maintain production, the control means may be operable, when the number of sections receiving gobs is less than the number of sections in the machine so that there are one or more spare sections, to determine operating parameters which allow any of the sections receiving gobs to be replaced by a spare section. Thus, when one of the operating sections has to be shut down for repair, it can be replaced by a spare section if such a spare section is available. Furthermore, it is possible to devise a routine sequence of maintenance in which sections are automatically taken out of production for maintenance and replaced by spare sections so that all the sections receive maintenance in turn.

As is common practice, the furnace may be arranged to supply molten glass to a plurality of production lines each comprising a forehearth, a feeder, an electronically programmable gob distributor, a glassware forming machine of the individual section type, an electronic control system for the glassware forming machine, pusher means associated with each section of the machine and a conveyor. In this case, the control means may be operable to determine the operating parameters for two or more of the production lines. In this case, the control means may be operable, when determining operating parameters for a particular production line, to reassess the operating parameters of other production lines to determine whether those parameters could be changed to allow greater utilisation of the melting capacity of the furnace. This enables the glass utilisation to be further maximised since it may be possible, when the articles manufactured on one production line are changed, to increase the number of sections on a different production line which are in operation or the speed of the machine on that production line and thereby increase the glass usage.

In determining the operating parameters, the control means of the apparatus may calculate the melting capacity required to operate all available sections at the maximum possible speed, determine whether the available melting capacity is greater than or equal to the melting capacity required and, if so, establish operating parameters to include all the sections and the maximum possible speed. If the available melting capacity is less than that required, the control means may proceed to calculate the melting capacity required to operate all available sections at the minimum possible speed, determine whether the available melting capacity is greater than or equal to the melting capacity required and, if so, calculate the speed which utilises substantially all the available melting capacity and establish the operating parameters to include all the sections and the calculated speed. If the capacity is not less than or equal to the available melting capacity, the control means repeats the above-mentioned procedure using one less section in the calculations until a number of sections and a speed are established which require a melting capacity less than or equal to that available.

The invention also provides a method of controlling apparatus for use in the manufacture of glassware articles, the apparatus comprising a furnace in which raw materials are melted to form molten glass, a forehearth channel through which molten glass flows out of the furnace, a feeder associated with the forehearth and operable to form molten glass in the forehearth into discrete gobs which fall from the feeder, a gob distributor arranged to distribute gobs falling from the feeder to the sections of a glassware forming machine of the individual section type of the apparatus, the gob distributor being electronically programmable to determine which of the sections of the machine receive gobs and the sequence in which those sections receive gobs, an electronic control system for the glassware forming machine operable to control the timing of the operation of components of those sections which receive gobs in timed relation to one another so that gobs received by a section are formed into articles of glassware which are deposited on a deadplate of the section, and pusher means associated with each section of the machine operable to push articles from the deadplate of the section onto a conveyor of the apparatus which runs past the deadplates of all the sections, the method comprising determining operating parameters for the apparatus to allow a particular article to be manufactured, the parameters including the number of sections of the glassware forming machine which are to receive gobs, and the speed at which those sections are to be operated, the parameters being determined from the available melting capacity of the furnace, the weight of the particular article and the speed at which the particular article can be formed, setting the operating speed of the furnace to produce gobs at the intervals required by the operating parameters, programming the gob distributor to deliver gobs to the sections which are to receive gobs in a predetermined sequence, programming the electronic control system so that the sections which are to receive gobs operate at the required speed and in the required time relationship to one another, programming the pusher means so that the pusher means associated with sections of the machine which are to receive gobs operate at the required times, and setting the speed of the conveyor so that the conveyor is able to remove the articles formed.

In a method in accordance with the last preceding paragraph, when the number of sections receiving gobs is less than the number of sections in the machine so that there are one or more spare sections, the method may also comprise re-programming the gob distributor, the electronic control system and the pusher means to allow any of the sections receiving gobs to be replaced by a spare section.

In a method in accordance with the invention, wherein the furnace is arranged to supply molten glass to a plurality of production lines each comprising a forehearth, a feeder, an electronically programmable gob distributor, a glassware forming machine of the individual section type, an electronic control system for the glassware forming machine, pusher means associated with each section of the machine and a conveyor, the method may be applied to two or more of the production lines with the operating parameters of the lines being adjusted to maximise utilisation of the melting capacity of the furnace.

In determining the operating parameters, the melting capacity required to operate all the available sections at the maximum possible speed may be calculated, whether the available melting capacity is greater than or equal to the melting capacity required may be determined and, if so, the operating parameters may be established to include all the sections at the maximum possible speed. If the available melting capacity is less than that required, the melting capacity required to operate all available sections at the minimum possible speed may be calculated, whether the available melting capacity is greater than or equal to the melting capacity required may be determined and, if so, the speed which utilises substantially all the available melting capacity may be calculated and the operating parameters established to include all the sections and the calculated speed. If the last-mentioned required melting capacity is not less than or equal to the available melting capacity, the above-mentioned procedure may be repeated using one less section in the calculations until a number of sections and a speed are established which require a melting capacity less than or equal to that available.

BRIEF DESCRIPTION OF THE DRAWINGS

There now follows a detailed description, to be read with reference to the accompanying drawings of an apparatus for use in the manufacture of glassware articles which is illustrative of the invention and of an illustrative method of controlling such an apparatus. It is to be understood that the illustrative apparatus and the illustrative method have been selected for description by way of example and not of limitation of the invention.

In the drawings:

FIG. 3 is a cross-sectional view taken through moving means and control means of the gob distributor shown in FIG. 2; and FIG. 4 is a flow chart illustrating the operation of the control means of the apparatus.

DETAILED DESCRIPTION OF PREFERRED EMBODIMENT OF THE INVENTION

Figure 1:
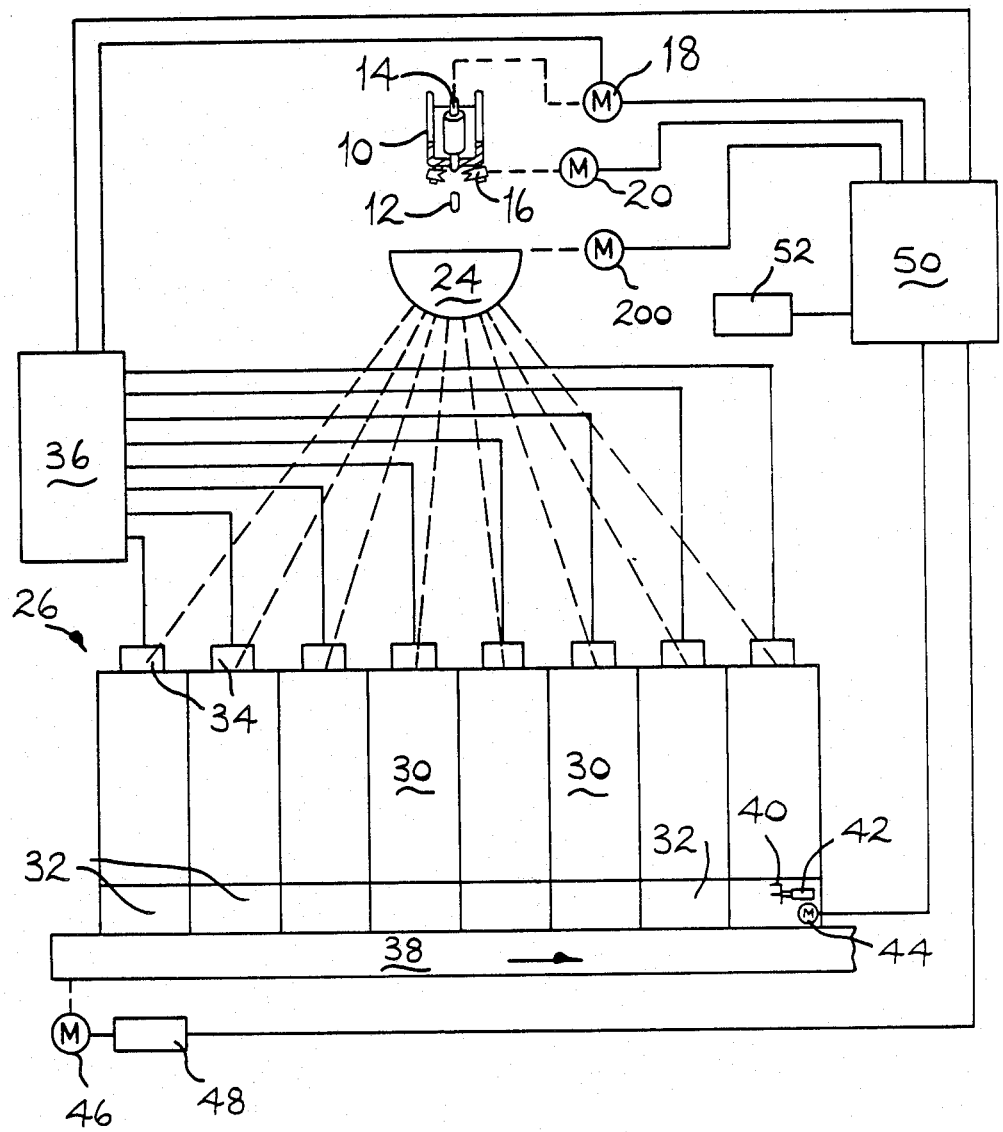
FIG. 1 is a diagrammatic view of the illustrative apparatus but omitting the furnace thereof.

The illustrative apparatus is for use in the manufacture of glassware articles, for example bottles. The apparatus comprises a furnace (not shown) of conventional construction in which raw materials are melted to form molten glass. The level of molten glass in the furnace is maintained at a constant level by conventional means. The illustrative apparatus also comprises a forehearth channel 10 through which molten glass flows out of the furnace. A feeder of the illustrative apparatus is associated with the forehearth 10 and is operable to form molten glass in the forehearth into discrete gobs 12 which fall from the feeder. The feeder comprises a plunger 14 which can be raised and lowered to open and close an orifice in the bottom of the forehearth 10, and shears 16 which are operable to shear gobs 12 from the glass which passes through the orifice closed by the plunger 14. The plunger 14 is raised and lowered by the operation of a motor 18 and the shears are operated by a motor 20. The illustrative apparatus also comprises a gob distributor 24 (shown diagrammatically in FIG. 1 and in more detail in FIGS. 2 and 3). The gob distributor 24 is arranged to distribute gobs 12 to the sections of a glassware forming machine of the individual section type 26 of the illustrative apparatus. The machine 26 is of conventional construction and has eight sections 30 arranged side by side. The machine may, however, be any machine of the individual section type, for example an R.I.S. machine in which the finish moulds are mounted on a turntable. Each section (details of which are not shown in the drawings) has a blank mould in which a gob of molten glass is formed into a parison, transferring means operable to transfer the parison from the blank mould to a blow mould of the section in which the parison is blown into an article of glassware, and take-out means operable to remove the article from the blow mould and deposit it on a deadplate 32 of the section. The various components of each section 30 are moved by pneumatic means (not shown) controlled by a block of valves 34 which are electronically controlled to cause the components of the section 30 to operate in timed relationship with one another to form the gob into an article of glassware. The gob distributor 24 is arranged to deliver gobs 12 to the sections 30 in a predetermined sequence so that each successive gob 12 is delivered to a different one of the sections and those sections which receive gobs operate with phase differences between them to take account of the different arrival times of the gobs at the sections.

The illustrative apparatus also comprises an electronic control system 36 for the machine 26 which is operable to control the timing of the operation of the components of the sections 30 which receive gobs in timed relationship to one another by controlling the valves in the valve blocks 34. The control system 36 is also of conventional construction.

The illustrative apparatus also comprises pusher means associated with each section 30 of the machine 26 operable to push articles from the deadplates 32 of each section 30 on which the articles are deposited by the take-out means. The articles are pushed from the deadplates 32 onto a conveyor 38 of conventional construction which runs past the deadplates 32 of all the sections. The pusher means comprises a pusher 40 at each section 30 (only the pusher means associated with one of the sections being shown in FIG. 1). The pusher 40 is mounted on a piston and cylinder assembly 42 which is operable to move the pusher 40 so that it engages an article on the deadplate 32 and a motor 44 which is operable to turn the assembly 42 about a vertical axis so that the pusher 40 pushes the articles onto the conveyor 38. The motor 44 may be a DC servo motor which is electronically programmable by altering the control signals thereto. Alternatively, the motor 44 may not be a servo motor but a servo motor may be used to control either the power supply to the motor 44 or stops engaged by the motor 44 so that its motion is electronically programmable. The conveyor 38 is driven by an AC electric motor 46 which receives its power supply from an inverter 48.

The illustrative apparatus also comprises control means operable to determine the operating parameters of the apparatus to allow a particular article to be manufactured, the parameters including the number of sections of the glassware forming machine 26 which are to receive gobs and the speed at which these sections are to be operated. The control means comprises a computer 50 which is connected to a terminal 52 by which information from which the operating parameters may be calculated is fed to the computer 50. The computer 50 is arranged to determine the operating parameters from the available melting capacity of the furnace, the weight of the particular article to be manufactured and the speed at which the particular article can be formed.

FIG. 4 illustrates the operation of the computer 50 to determine the operating parameters. It should, however, be understood that the operating parameters can be established by other procedures than that shown in FIG. 4. FIG. 4 shows that the computer 50 first receives information from the terminal 52 and the receipt of this information is illustrated by boxes 61 to 65 in FIG. 4. In box 61 the computer 50 reads the weight of the article to be manufactured. This weight will be the weight of each individual gob G. In box 62, the computer 50 reads the speed S at which the article can be manufactured. This speed may be alternatively retrieved from a job history file if the particular article has previously been manufactured. The speed factor S is expressed in the number of articles which can be manufactured in a given time in a single mould. In box 63, the computer 50 reads the tolerance T which can be applied to the speed S. The speed S is the middle of the range of possible speeds and S+T is the maximum speed and S−T is the minimum speed. S and T are determined by characteristics of the particular article which are related to the thermodynamic processes necessary in the machine 26. In the box 64, the computer 50 reads the number of moulds M which each section 30 of the machine 26 has. It is common practice, to provide two or more gobs simultaneously to each section of a machine and thus the glass usage is a factor of the number of moulds in each machine section 30. In the box 65, the computer 50 reads the number N of sections of the machine 26 which are available. Although the machine 26 has eight sections, some of the sections may not be available due to breakdowns etc.

After reading the quantities W, S, T, M and N, the computer 50 performs a calculation in box 66. this calculation determines PH which is the highest pull which will be caused by manufacturing the particular article at the maximum speed on the number of sections N with a number of moulds M, this being given by W multiplied by S+T multiplied by M multiplied by N. The computer then proceeds to perform a further calculation in box 67, calculating the quantity PL which is the lowest pull on the furnace which will be caused by manufacturing the particular article at the lowest possible speed with a number of sections N. This quantity is given by W multiplied by S−T multiplied by M multiplied by N. The computer 50 next proceeds to box 68 in which it performs a comparison to determine whether PH is less then or equal to the available melting capacity of the furnace C. If only one machine is being supplied with glass from the furnace, the quantity C will be the total melting capacity of the furnace. However, if more than one machine is being supplied from the furnace through a number of forehearths, the available capacity C may have to be calculated by the computer 50 by subtracting the capacity required for the other machines from the total melting capacity of the furnace. If the computer 50 finds that the quantity PH is greater than the quantity C it proceeds to a box 69, this indicating that there is insufficient melting capacity available to manufacture the particular article at maximum speed with a number of sections N. In the box 69 the computer 50 compares the quantity PL with the quantity C to determine whether PL is less than or equal to C. If the computer 50 finds that the quantity PL is greater than C it proceeds to a box 70, this indicating that the particular article cannot be manufactured at the minimum possible speed with the number of sections N. In the box 70 the computer subtracts one from the quantity N and then returns to the box 66 and proceeds as aforementioned to determine whether the particular article can be manufactured with one less than the total number of available sections 30. If in the box 68 the computer 50 finds that the quantity PH is less than or equal to the quantity C, indicating that the available melting capacity of the furnace is greater than the highest pull on the furnace and therefore that the particular article can be manufactured at maximum speed with the number of sections N, the computer proceeds to a box 71 in which it proceeds to establish settings for the process control. It will establish the settings as the maximum speed possible, i.e. S+T, and the number of sections at N. If in the box 69 the computer 50 finds that the quantity PL is less than or equal to the quantity C, indicating that the available melting capacity is greater than the pull required at minimum possible speed, the computer 50 proceeds to a box 72 where it calculates a quantity Z which is given by the equation W×(S+Z)×M×N=C. The quantity Z (which may be positive or negative) represents the adjustment which is required to the speed S to use the maximum available melting capacity with the number of sections N. The computer 15 then proceeds to the box 71 where it establishes settings for the process control using N as the number of sections and S+Z as the speed.

The computer 50 is also operative to determine the sequence in which the sections 30 are to receive gobs 12, and operative to provide control signals to the gob distributor 24, and to the electronic control system 36 to cause them to operate in accordance with the predetermined parameters. Specifically, the control signals will cause the gob distributor 24 to deliver gobs to a number of the sections of the machine 26 which has been determined in the process parameters. For example, the computer 50 may have decided that only five sections can be run with the available melting capacity, in this case the distributor 24 operates to distribute gobs to only five of the eight sections. The signals received by the electronic control system 36 cause it to provide control signals to only those sections 30 which receive gobs from the gob distributor 24 and to work those sections 30 at the speed determined by the computer 50 and with the phase differences required by the predetermined sequence of sections established by the computer 50.

The computer 50 is also operable to provide control signals to the feeder, the pushers 40 and the conveyor 38 to cause them to operate in co-operation with the gob distributor 24 and the electronic control system 36. Specifically, the computer 50 provides control signals to motors 18 and 20 of the feeder to cause gobs to be formed at the correct rate, provides control signals to the motors 44 of the pusher means to cause those pushers 40 associated with sections 30 which are receiving gobs to be operated in the correct sequence, and provides a control signal to the inverter 48 to indicate the frequency that the inverter 48 should supply to the motor 46 to cause the conveyor 38 to run at the correct speed to remove the articles from the machine 26. Although not indicated in FIG. 1, the computer 50 is also operable to provide control signals to article handling apparatus to which the conveyor 38 delivers the articles, such handling apparatus including a transfer wheel operable to transfer the articles from the conveyor 38, a cross conveyor operable to receive the articles from the transfer wheel, and a stacker arranged to stack the articles.

The control means 50 is also operable, on receipt of instructions from the terminal 52 and, when the number of sections N receiving gobs is less than the number of sections in the machine 26 so that there are one or more spare sections, to determine operating parameters which allow any of the sections receiving gobs to be replaced by a spare section. This arrangement allows a section 30 to be withdrawn from operation either because of a breakdown or because of routine maintenance and be replaced by another section 30 thereby, preventing loss of production.

Where the furnace is arranged to supply molten glass to a plurality of production lines each comprising a forehearth, a feeder, an electronically programmable gob distributor, a glassware forming machine of the individual section type, an electronic control system for the glassware forming machine, pusher means associated with each section of the machine and a conveyor, the computer 50 is operable to determine the operating parameters for all the production lines. In this case, the computer 50 is operable, when determining operating parameters for a particular production line, to reassess the operating parameters of all the productions lines to determine whether those parameters could be changed to allow greater utilisation of the melting capacity of the furnace. Thus, when the particular article being manufactured by a particular production line is changed, the computer 50 investigates whether it is possible to use any additional melting capacity which has become available because of the change on any of the other production lines. Such a change may of course require an alteration to the speed or the number of sections in use on one or more of the other production lines.

In the illustrative method of controlling the apparatus for use in the manufacture of glassware articles, the illustrative apparatus shown in FIG. 1 is used. The illustrative method comprises determining operating parameters for the apparatus to allow a particular article to be manufactured, the parameters including the number of sections of the machine 26 which are to receive gobs, and the speed at which those sections are to be operated, the parameters being determined from the available melting capacity of the furnace, the weight of the particular article and the speed at which the particular article can be formed. The illustrative method also comprises setting the operating speed of the feeder to produce gobs 12 at the intervals required by the operating parameters, programming the gob distributor 24 to deliver gobs 12 to the sections 30 which are to receive gobs in a predetermined sequence, programming the electronic control system 36 so that the sections which are to receive gobs operate at the required speed and in the required time relationship to one another, programming the pusher means so that those pusher 40 associated with sections 30 of the machine 26 which are to receive gobs operate at the required times, and setting the speed of the conveyor 38 so that the conveyor is able to remove the articles formed. Where the number of sections receiving gobs is less than the number of sections in the machine 26 so that there are one or more spare sections, the illustrative method also comprises re-programming the gob distributor, the electronic control system and the pusher means to allow any of the sections receiving gobs to be replaced by a spare section. It is not necessary in this case to re-programme the feeder or to re-set the timing of the conveyor 38. Where the furnace is arranged to supply molten glass to a plurality of production lines, the illustrative method is applied to all the production lines individually with the operating parameters of the lines being adjusted to maximise utilisation of the melting capacity of the furnace.

In the illustrative method in determining the operating parameters, the melting capacity required to operate all the available sections 30 at the maximum possible speed is calculated, whether the available melting capacity is greater than or equal to the melting capacity required is determined and, if so, the operating parameters are established to include all the sections and the maximum possible speed. However, if the available melting capacity is less than that required, the melting capacity required to operate all available sections at the minimum possible speed is calculated, whether the available melting capacity is greater than or equal to the melting capacity required is determined and, if so, the speed which utilises substantially all the available melting capacity is calculated and the operating parameters are established to include all the sections and the calculated speed. However, if the available melting capacity is not greater than the last-mentioned required melting capacity the above-mentioned procedure is repeated using one less section in the calculations until a number of sections and a speed are established which require a melting capacity less than or equal to that available.

The gob distributor 24 of the illustrative apparatus is operable to deliver two gobs at a time to section 30, the feeder being adapted to form two gobs at a time. The gob distributor 24 is electronically programmable and is the subject of a co-pending patent application of the present applicants.

The gob distributor 24 is supported by a beam 110 of the machine 26 which extends transversely above the sections 30. A plate 112 is bolted on top of the beam by bolts 114. A bracket 116 projects from the plate 112 normally of the beam 110. A cylindrical column 118 projects upwardly from the bracket 116 and the illustrative gob distributor is pivotally supported on this column 118. The gob distributor 24 also comprises a housing 120 which is pivotally mounted on the column 118 and serves to support the remaining parts of the distributor. The housing 120 is pivoted about the column 118 by the action of the piston and cylinder assembly 122 which acts between a bracket 124 on housing 120 and a bracket 126 mounted on a plate 112. The assembly 122 is operable to pivot the distributor between an operative position thereof (shown in FIG. 2) in which the distributor can distribute gobs and an inoperative position (reached by a clockwise turn about the column 118, viewing FIG. 2) in which maintenance can be carried out on the distributor 24.

The gob distributor 24 also comprises a gob-delivering scoop 130 having cylindrical upper end portion 132 arranged to receive gobs falling from the feeder along a vertical axis 134. Scoop 130 is turnable about the vertical axis 134, which extends centrally through the upper end portion 132 thereof, to align a lower trough-like end portion 136 of the scoop with gob-delivering guides of the sections 30. Further scoop 140 has an upper end portion 142 which is turnable about a vertical axis 144 to align a lower end portion 146 of the scoop with other gob-delivering guides of the sections 30 so that gobs falling from the feeder along vertical axis 144 can be delivered.

Figure 2:
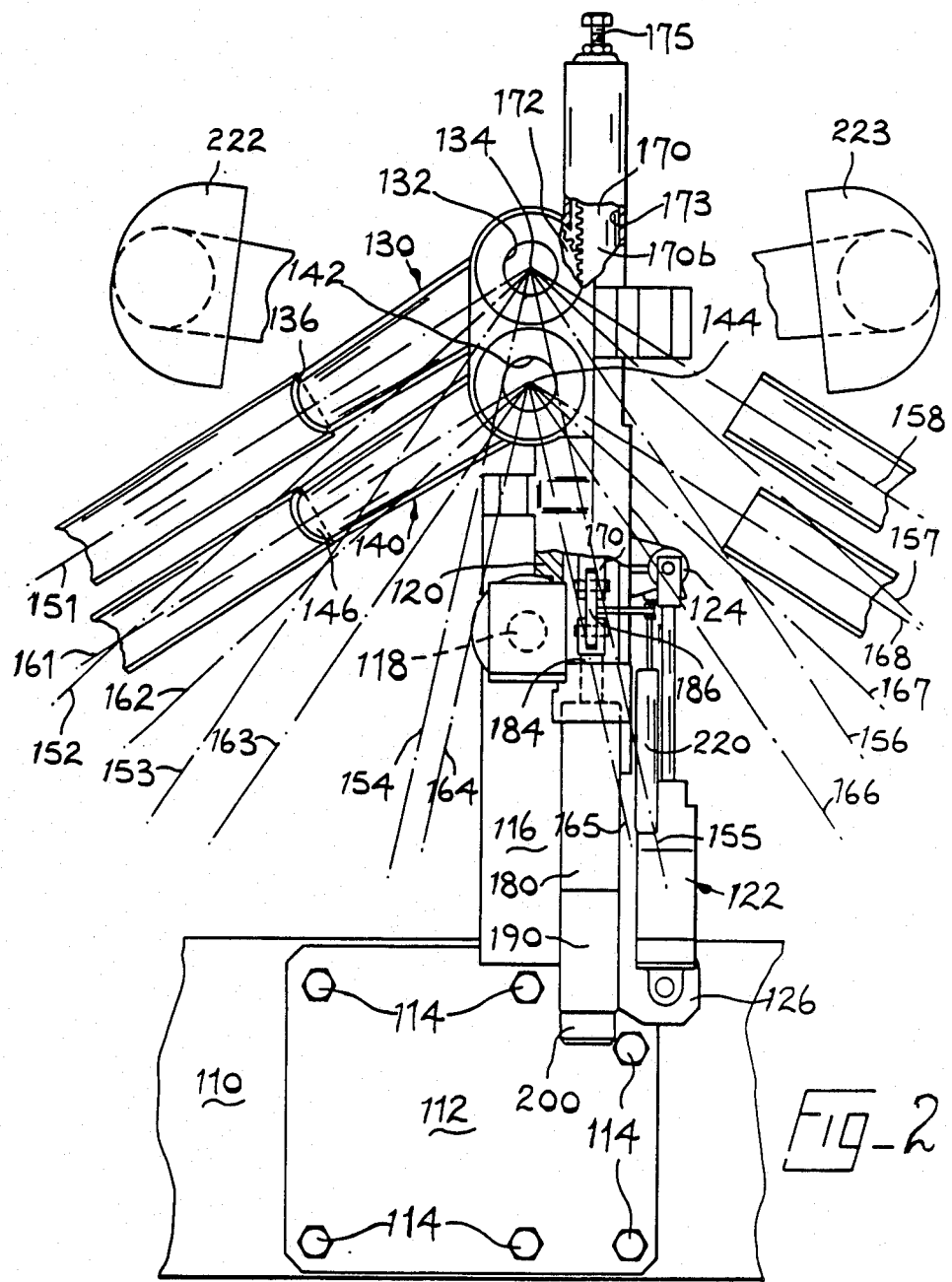
FIG. 2 is a plan view of the gob distributor of the illustrative apparatus.

There are two-gob delivering guides associated with each of the eight sections 30 of the machine 26, one guide having an upper end portion arranged so that the lower end portion 136 of the scoop 130 can be aligned therewith and the other having an upper end portion arranged so that the lower end portion 146 of the scoop 140 can be aligned therewith. In the interests of clarity, only the upper end portions of the gob delivering guides of sections 1 and 8 are shown in FIG. 2. However, the centre-lines of a gob-delivering guides associated with a scoop 130 are indicated by the lines 151 to 158 while those of the guides associated with the scoop 140 are indicated by the lines 161 to 168, guides 151 and 161 being associated with section 1, guides 152 and 162 being associated with section 2 and so on. Each gob-delivering guide acts to guide gobs received thereby to a mould of the section 30 with which is in associated.

The gob distributor 24 also comprises moving means operable to turn the scoop 130 about its vertical axis 134 and also to turn the scoop 140 about its vertical axis 144 to align the lower end portions 136 and 146 of the scoops with the gob-delivering guide. The moving means comprises a toothed rack 170 mounted for longitudinal movement on the housing 120. The rack 170 is meshed with two ring-shaped gears of the moving means. A first of the ring-shaped gears 172 is mounted on the housing 120 to turn about the vertical axis 134 and the scoop 130 passes through the gear 172 and is mounted on the gear to turn therewith. A second of the ring-shaped gears (not shown) is mounted on the housing 120 to turn about the vertical axis 144 and the scoop 140 is mounted thereon in similar fashion to the mounting of the scoop 130 on the gear 172. When the rack 170 is moved longitudinally thereof, both the gears are turned and hence so are the scoops 130 and 140. The scoop 140 is turned through a smaller arc than the scoop 130, this being achieved by providing more teeth on its gear than on the gear 172.

The moving means of the gob distributor 24 also comprises a fluid pressure-operated motor coupled to the rack 170 and, hence, to the scoops 130 and 140 so that operation of the motor moves the rack 170 and turns each scoop about its respective vertical axis. This fluid pressure-operated motor is provided by a hydraulic piston and cylinder assembly comprising a cylinder 180 mounted on the housing 120 (see also FIG. 3), a piston 182 movable along cylinder on the introduction of hydraulic fluid under pressure into the cylinder 180, and a piston rod 184 projecting from and movable with the piston 182. The piston rod 184 extends beyond the cylinder 180 and is coupled by a link 186 to the rack 170 (the link 186 and rack 170 have been omitted from FIG. 3).

The gob distributor 24 also comprises control means operable to control the moving means so that the lower end portions 136 and 146 of the scoops 130 and 140 are moved into alignment with the gob-delivering guides of the sections which are to receive gobs in a predetermined sequence in timed relationship to the receipt of gobs by the upper end portions 132 and 142 of the scoops 130 and 140 so that the gobs are delivered to the required sections 30 in the predetermined sequence.

The control means of the gob distributor 24 comprises a valve 190 mounted on the cylinder 180 and operable to control the supply of fluid under pressure to the piston and cylinder assembly 180, 182. The valve 190 has five ports and a spool 192 which is movable longitudinally to control the flow of hydraulic fluid through the ports. A first 194 of the ports is connected to a tank (not shown), a second 195 of the ports is connected to the interior of the cylinder 180 to the left (viewing FIG. 3) of the piston 182, a third 196 of the ports is connected to a source of hydraulic fluid under pressure provided by a pump (not shown), a fourth of the ports 197 is connected to the interior of the cylinder 180 to the right (viewing FIG. 3) of the piston 182, and a fifth 198 is connected to the first port 194 and to the tank. The spool 192 has a rest position (shown in FIG. 3) in which it shuts off the ports 194 and 197 and hence the supply of fluid under pressure to the cylinder 180 so that the piston 182 does not move and the scoops 130 and 140 are not turned. The spool 192 is displaced longitudinally thereof from its rest position in one direction (to the left viewing FIG. 3) to supply fluid to the cylinder 180 to cause the piston and cylinder assembly to turn the scoops 130 and 140 anti-clockwise. When the spool 192 is displaced to the left, the port 196 communicates with the port 195 so that fluid enters the cylinder 180 to the left of the piston 182. This causes the piston 182 to move to the right moving the piston rod 184 and the rack 170. This movement of the rack 170 turns the gears and the scoops 130 and 140 anti-clockwise. The port 197 communicates with the port 180 so that fluid can exhaust from the cylinder 180 from the right of the piston 182 to the tank. The spool 192 is also displacable in the opposite direction from its rest position (to the right viewing FIG. 3) to supply fluid to the cylinder 180 to cause the piston and cylinder assembly 180, 182 to turn the scoops 130, 140 clockwise. When the spool 192 is displaced to the right, the port 196 communicates with the port 197 so that fluid enters the cylinder 180 to the right of the piston 182. This causes the piston 182 to move to the left moving the piston rod 184 and the rack 170. This movement of the rack 170 turns the gears and the scoops 130 and 140 clockwise. The port 195 communicates with a port 194 so that fluid can exhaust from the cylinder 180 from the left of the piston 182 to the tank.

The control means of the gob distributor 24 also comprises a servo-motor operable to operate the valve 190 so that the piston and cylinder assembly 180, 182 turns the scoops 130 and 140 into the required alignment. The servo-motor is an electrical stepper-motor 200 mounted on the valve 190 and coupled to the spool 192 so that operation of the motor 200 is effective to displace the spool 192. The motor 200 has an output shaft 202 which is coupled to the shaft 204 by a resilient coupling 206 which allows the shaft 204 to move relative to the motor 200. The motor 200 is, thus, operable to turn the shaft 204. Shaft 204 is connected to the spool 192 so that turning the shaft 204 causes longitudinal displacing movement of the spool 192. The shaft 204 passes through the spool 192 and has a screw-threaded portion 208 which forms a screw-threaded connection with a threaded bush 210. The bush 210 is held against longitudinal movement by a flange 212 thereof which is turnably-received in a recess. The connection is such that turning the shaft 204 causes the portion 208 to move into or out of the bush 210 so that longitudinal movement of the shaft 210 and of the spool 192 is caused. The space between the spool 192 and the bush 210 is vented.

The piston and cylinder assembly 180, 182 is coupled to the spool 192 so that operation of the assembly causes the spool to be returned to its rest position. This coupling is by a screw-threaded connection between the piston 182 and a threaded spindle 214 which extends within the cylinder 180 longitudinally thereof. The spindle 214 is externally threaded, and passes through a threaded passage 216 in the piston 180 making a threaded connection therewith, and enters a recess 218 in the piston rod 184. The spindle 214 is integral with the bush 210 and is hence held against longitudinal movement. As the piston 182 cannot turn because of the coupling between the piston rod 184 and the rack 170, movement of the piston 182 causes the spindle 214 to turn. As the spindle 214 is integral with the bush 210 and hence is mounted to turn therewith, when the spindle 214 turns, so does the bush 210 and this moves the shaft 204 because of its screw-threaded connection with the bush 210. The arrangement of the screw-threads is such that movement of the piston 182 to the right causes the shaft 204 to be moved to the right. As movement of the shaft 204 causes movement of the spool 192, the spindle 214 is connected to the spool 192 so that turning the spindle causes movement of the spool, movement of the piston 182 to the left causes movement of the shaft 204 and spool 192 to the left. The spool 192 is moved towards it rest position in either movement of the piston 182.

In order to turn the scoops 130 and 140 anti-clockwise through the required angle to bring the scoops into alignment with gob delivering guides of a particular section 30, the computer 50 supplies an appropriate number of electrical pulses to the motor 200, the number of pulses being greater the greater that the angle is. This causes the motor 200 to turn the shaft 204 through a specific angle thereby moving the shaft 204 and compressing the coupling 206. This movement of the shaft 204 moves the spool 192 and causes fluid to enter the cylinder 180 to the left of the piston 182. The movement of the piston 182 moves the rack 170 and turns the scoops 130 and 140. The spindle 214 is also turned so that the spool 192 is returned to its rest position which it will reach after the motor 200 ceases operation. Once the spool 192 reaches its rest position, the piston 182 stops as its supply of fluid is cut off and the scoops 130 and 140 come to rest. The number of pulses supplied to the motor 200 controls precisely the movement of the piston 182 and hence of the rack 170. To turn the scoops 130 and 140 clockwise, the direction of the motor 200 is reversed to move the spool 192 to the right, expanding the coupling 206 so that the piston 182 moves to the left.

The gob distributor 24 can be rapidly re-programmed merely by altering a number of pulses supplied to the motor 200 for each movement thereof. As the motor 200 is only moving the shaft 204 and spool 192, it does not need to be a heavy duty servo-motor.

The gob distributor 24 also comprises a position feedback device provided by a linear variable differential transformer 220 mounted on the cylinder 180 and having its moving element attached to the coupling 186. The transformer 220 acts to monitor the movements caused by operation of the assembly 180, 182 by monitoring movements of the piston rod 184 so that emergency action can be taken in the event that the movements are not as expected. The computer 50 stores the predetermined sequence of the sections 30, provides pulses to the motor 200 in synchronization with the control signals of the feeder, and compares the output of the transformer 220 with that expected. The computer 50 is also programmable to align the scoops 130 and 140 with any of three cullet chutes 222, two visible in FIG. 2 and located beyond the guides 51 and 58 respectively and another (not shown) located between the guides 64 and 65 beneath the bracket 16. The scoops 130 and 140 are so aligned at a time when, according to the predetermined sequence, delivery would normally be to a particular section 30. This is done when the particular section becomes inoperative either temporarily or for a long period but there is no spare section available.

I claim:

1. A method for controlling glassware manufacture apparatus of the type including a furnace in which raw materials are melted to form molten glass, a forehearth channel through which molten glass flows out of the furnace, a feeder associated with the forehearth and operable to form molten glass from the forehearth into discrete gobs which fall from the feeder, a gob distributor for distributing gobs falling from the feeder to the sections of a glassware forming machine of the individual section type, the gob distributor being electronically programmable to determine which sections of the machine receive gobs and the sequence in which those sections receive gobs, an electronic control system for the glassware forming machine operable to control the timing of the operation of the components of those sections which receive gobs in relationship to one another so that the gobs received by a sections are formed into articles of glassware, and transfer means associated with each section of the machine operable to transfer articles from the section onto an outfeed conveyor, said method comprising the steps of:

determining the available melting capacity of the furnace, weight of the glassware article to be formed, and range of speeds at which such glassware article can be formed, based upon the determined parameters, calculating the number of sections of the glassware forming machine which are to receive gobs, and the speed at which these sections are to be operated, setting the rate of gob formation of the feeder at intervals required by the calculated parameters, programming the gob distributor to cause it to operate in accordance with the calculated parameters, and causing the electronic control system to control the timing of the glasware forming machine according to the calculated parameters.

2. A method according to claim 1, further comprising the step of programming the transfer means so that the transfer means for sections which are to receive gobs operate in coordination with the timing of those sections.

3. A method according to claim 1, further comprising the step of setting the speed of the outfeed conveyor in accordance with the calculated parameters.

4. A method according to claim 1, further comprising the step of causing a given section which is to receive gobs to be replaced by a spare action, in the event that the number of sections receiving gobs is less than the number of sections in said forming machine, and it is desired to de-activate the given section.

5. A method according to claim 1, wherein the furnace supplies molten glass to a plurality of production lines each comprising a forehearth, a feeder, an electronically programmable gob distributor, a glassware forming machine of the individual section type, an electronic control system for the glassware forming machine, transfer means associated with each of the forming machine sections, and a conveyor, and wherein the method is applied to at least two of the production lines with the operating parameters of the lines being adjusted to maximize utilization of the melting capacity of the furnace.

6. A method according to claim 1, wherein at the calculating step, the melting capacity required to operate all the available sections at the maximum possible speed is calculated, whether the available melting capacity is greater or equal to the melting capacity required is determined and, if so, the operating parameters are established to include all the sections at the maximum possible speed, or, if the available melting capacity is less than that required, the melting capacity required to operate all available sections at the minimum possible speed is calculated, whether the available melting capacity is greater than or equal to the melting capacity required is determined and, if so, the speed which utilizes substantially all the available melting capacity is calculated and the operating parameters are established to include all the sections and calculated speed, or, if not, the above-mentioned procedure is repeated using one less section in the calculations until a number of sections and the speed are established which require a melting capacity less then or equal to that available.

7. A method for controlling glassware manufacture apparatus of the type including a furnace in which raw materials are melted to form molten glass, a forehearth channel through which molten glass flows out of the furnace, a feeder associated with the forehearth and operable to form molten glass from the forehearth into discrete gobs which fall from the feeder, a gob distributor for distributing gobs falling from the feeder to the sections of a glassware forming machine of the individual section type, the gob distributor including electronic control of which sections of the machine receive gobs and the sequence in which those sections receive gobs, an electronic control system for the glassware forming machine operable to control the timing of the operation of the components of those sections which receive gobs in relationship to one another so that the gobs received by a section are formed into articles of glassware, and transfer means associated with each section of the machine operable to transfer articles from the section onto an outfeed conveyor, said method comprising the steps of:

determining the available melting capacity of the furnace, weight of the glassware article to be formed, and range of speeds at which such glassware article can be formed.

based upon the determined parameters, calculating the number of sections of the forming machine to be employed on the basis of the maximum number of operable sections which do not exceed the melting capacity of the furnace in view of the weight of articles to be formed and range of forming speeds, and calculating the forming speed of said number of sections, and and controlling the operation of the forming machine, gob distributor, and feeder in accordance with the calculated parameters.

8. A method according to claim 7 further comprising the step of controlling the operation of the transfer means in accordance with the calculated parameters.

* * * * *